United States Patent [19]

Last

[11] 4,061,922
[45] Dec. 6, 1977

[54] ULTRAVIOLET SENSING DEVICE

[75] Inventor: Anthony J. Last, Aakville, Canada

[73] Assignee: John S. Ewald, Cuernavaco Morelos, Mexico

[21] Appl. No.: 686,788

[22] Filed: May 17, 1976

[51] Int. Cl.$^2$ ............................................. G01N 21/38
[52] U.S. Cl. ............................. 250/461 R; 250/372; 250/432 R
[58] Field of Search ................. 250/458, 459, 461 R, 250/432 R, 372

[56] References Cited

U.S. PATENT DOCUMENTS

| 3,471,693 | 10/1969 | Veloz | 250/432 R |
| 3,956,630 | 5/1976 | Mellows | 250/461 R X |

Primary Examiner—Archie R. Borchelt
Attorney, Agent, or Firm—Kenway & Jenney

[57] ABSTRACT

The ultraviolet sensing device disclosed herein employs a visible light sensitive photoconductive cell which is protected from direct exposure to ultraviolet light by a housing. Ultraviolet light entering the housing through a quartz window illuminates a fluorescent material and the photoconductive cell is oriented so as to receive visible light given off by the fluorescent material while being shielded from the direct ultraviolet rays.

1 Claim, 2 Drawing Figures

ULTRAVIOLET SENSING DEVICE

BACKGROUND OF THE INVENTION

This invention relates to an ultraviolet sensing device and more particularly to a low cost, fail-safe sensor for an utlraviolet water purifier.

Ultraviolet water purifiers normally employ a fail-safe circuit for turning off the water supply in the event of a failure in the purification system, e.g., a burning out of the mercury vapor lamp typically employed for such water purification. Such circuits often employ a photocell specifically designed for the 2537 A peak output wavelength of such mercury lamps. Such special purpose photocells are difficult and therefore expensive to manufacture.

Among the several objects of the present invention may by noted the provision of an ultraviolet sensing device suitable for ultraviolet water purifiers; the provision of such a sensor which is of relatively low cost, which is reliable and which is of relatively simple and inexpensive construction. Other objects and features will be in part apparent and in part pointed out hereinafter.

SUMMARY OF THE INVENTION

Briefly, ultraviolet sensing apparatus according to the present invention employs a housing having on one side a window for admitting ultraviolet radiation into the housing. On the side of the housing opposite the window, a fluorescent screen is positioned so as to emit visible light in response to ultraviolet irradiation entering through the window. A photoconductive cell responsive to visible light is oriented within the housing so as to receive visible light emitted by the screen while being shielded from ultraviolet radiation entering through the window.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
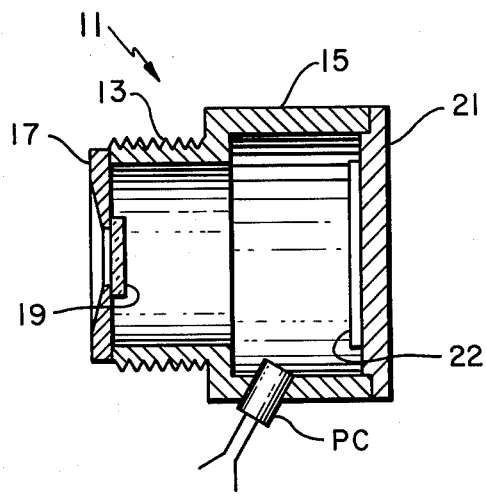
FIG. 1 is a side view in section of an ultraviolet sensor constructed in accordance with the present invention.

Referring now to FIG. 1, the ultraviolet sensor illustrated there employs a housing 11 of generally cylindrical shape. One end of the housing 11 comprises a threaded portion 13 adapted to be screwed into the side wall of an ultraviolet water purifier while the rear portion 15 of the housing 11 is of slightly larger diameter. A front cap 17 is sealed over the smaller end of the housing 11 and carries a quartz window 19.

The back of the housing 11 is closed by a cap 21 which also carries a fluorescent screen 22. The fluorescent screen 22 comprises a material, e.g., anthracene or fluorescein, which is responsive to the dominantly 2537 A ultraviolet light generated by the purifying lamp and which emits visible light in response to the incident ultraviolet light.

A photoconductive cell PC is mounted in an aperture in the side wall of the housing 11 and is oriented so as to receive visible light given off by the screen 22 but, also, so as to be shielded from direct ultraviolet light entering through the window 19. While photocells directly responsible to 2537 A ultraviolet light are relatively expensive, the photoconductive cell PC may be of a quite inexpensive type which would be quickly destroyed by direct exposure to the ultraviolet light, e.g., a cadmium sulfide or selenide photoconductive cell.

Figure 2:
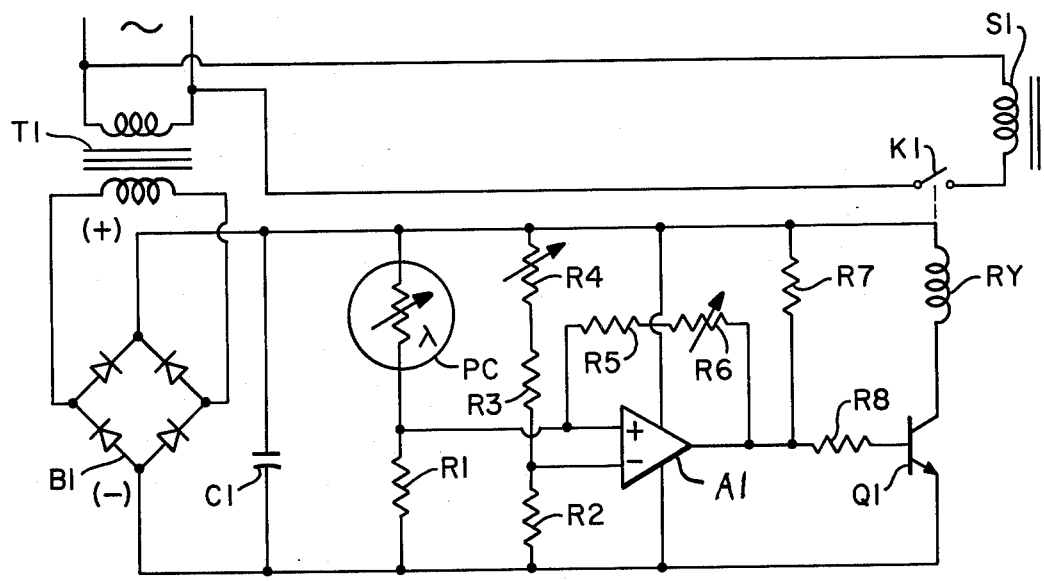
FIG. 2 is a schematic circuit diagram illustrating a fail-safe control for an ultraviolet water purifier, employing the sensor of FIG. 1.

Referring now to FIG. 2, a.c. line voltage is reduced to a level appropriate for the semiconductor control circuitry by a transformer T1. The reduced a.c. voltage is rectified and filtered by a diode bridge B1 and a filter capacitor C1, respectively, to provide a suitable d.c. supply voltage. The photoconductive cell PC is connected with a resistor R1 as a voltage divider across the d.c. supply.

The variable voltage generated between the photoconductive cell PC and the resistor R1 is connected to the inphase input of an operational amplifier or comparator A1. A reference voltage is applied to the inverting input of amplifier A1 by a voltage divider comprising resistances R2–R4 connected in series across the d.c. supply. Resistors R1 and R2 are of equal values so that, as will be apparent to those skilled in the art, the conductivity or resistance of the photocell is sensed with respect to the sum of the resistances R3 and R4. The resistance R4 is adjustable, as indicated, so as to provide selectable threshold of operation. Positive feedback is provided around the amplifier A1 by a pair of resistors R5 and R6, in series, connecting the output to the inphase input of the amplifier. This feedback path provides a snap action or hysteresis mode of operation as will be understood by those skilled in the art, the resistance R6 being variable to allow an adjustment of the amount of hysteresis.

The output of the amplifier A1 is also applied, through a resistive network comprising resistors R7 and R8, to a power transistor Q1 which controls the energization of a relay coil RY. Relay coil RY operates a set of contacts K1 which control the energization of the valve solenoid S1 which, in turn, controls the passage of water through the purifier.

Under high illumination levels, the resistance of the photoconductive cell PC, designated R, is less than the sum of the resistances in the upper half of the reference voltage divider circuit and thus the voltage provided by the sensing divider and applied to the in-phase input of the amplifier will be greater than that provided by the reference voltage divider and applied to the inverting input of the amplifier. Accordingly, the output of the amplifier will be positve, driving the transistor Q1 into conduction and energizing the relay coil RY so that the solenoid S1 is also energized, admitting water into the purifier. If, however, the purifying lamp burns out and a low light level condition prevails, the voltage provided by the sensing voltage divider will drop below that provided by the reference voltage divider, the comparator output will go negative, the transistor Q1 will be cut off and the relay will de-energize the water valve solenoid S1.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

I claim:

1. A fail-safe control for an ultraviolet water purifier comprising:

a housing;

on one side of said housing, a window for admitting ultraviolet radiation;

on the side of said housing opposite said window, a fluorescent screen which emits visible light in response to ultraviolet irradiation;

a photoconductive cell responsive to visible light, said photoconductive cell being oriented within said housing to receive visible light emitted by said screen while being shielded from ultraviolet radiation entering through said window;

electromechanical means for controlling the flow of water through said purifier;

voltage divider means including said photoconducitve cell for providing a voltage which varies in response to the illumination of said photoconductive cell;

voltage divider means for generating a reference voltage; and electronic means interconnected with said divider means for controlling the electrical energization of said electromechanical means as a function of the relative values of said voltages.

* * * * *